(12) United States Patent
Choi et al.

(10) Patent No.: US 7,174,755 B1
(45) Date of Patent: Feb. 13, 2007

(54) MOUNTING STRUCTURE OF STEERING COLUMN LOCKING DEVICE

(75) Inventors: Sung-Ook Choi, Cheonan-si (KR); Jin-Sang Chung, Suwon-si (KR)

(73) Assignees: Hyundai Motor Company, Seoul (KR); Huf Hulsbeck & Furst GmbH & Co. KG, Velbert (DE)

( * ) Notice: Subject to any disclaimer, the term of this patent is extended or adjusted under 35 U.S.C. 154(b) by 0 days.

(21) Appl. No.: 11/297,825

(22) Filed: Dec. 7, 2005

(30) Foreign Application Priority Data

Nov. 15, 2005 (KR) ...................... 10-2005-0109093

(51) Int. Cl.
*B60R 25/02* (2006.01)

(52) U.S. Cl. ............................ 70/186; 70/252; 70/422; 280/750

(58) Field of Classification Search ................. 70/247, 70/248, 252, 182–186, 422, 1.5, 1.7; 280/750, 280/777; 180/271
See application file for complete search history.

(56) References Cited

U.S. PATENT DOCUMENTS

| | | | | |
|---|---|---|---|---|
| 2,855,233 A | * | 10/1958 | Gibbs | 267/226 |
| 3,442,102 A | * | 5/1969 | Butts | 70/1.5 |
| 5,211,042 A | * | 5/1993 | Watanuki | 70/252 |
| 5,719,132 A | * | 2/1998 | Lin et al. | 514/50 |
| 6,357,794 B1 | * | 3/2002 | DuRocher | 280/777 |

FOREIGN PATENT DOCUMENTS

| | | |
|---|---|---|
| DE | 21 30 810 | 12/1972 |
| DE | 699 08 238 T2 | 3/2004 |
| JP | 2003-040080 | 2/2003 |

* cited by examiner

*Primary Examiner*—Lloyd A. Gall
(74) *Attorney, Agent, or Firm*—Peter F. Corless; Edwards Angell Palmer & Dodge LLP

(57) ABSTRACT

Disclosed herein is a mounting structure of a steering column locking device which makes it possible for the steering column locking device to be rotated upwards with respect to a steering column by an impact when part of a driver's body bumps against the steering column locking device in an accident, thereby minimizing injury to the driver. The mounting structure of the steering column locking device according to the present invention includes a connection housing which is mounted at a first end thereof to a steering column, with a coupling slot formed in a second end of the connection housing. The mounting structure of the steering column locking device further includes a coupling protrusion which is provided on the steering column locking device so that the coupling protrusion is movable inserted into the coupling slot of the connection housing, and a locking pin which is fitted into the coupling slot to support the coupling protrusion such that the coupling protrusion remains a stationary state. The locking pin breaks when a predetermined amount of impact or more is applied to the coupling protrusion.

5 Claims, 4 Drawing Sheets

MOUNTING STRUCTURE OF STEERING COLUMN LOCKING DEVICE

CROSS-REFERENCE TO RELATED APPLICATIONS

The present application is based on, and claims priority from, Korean Application Ser. No. 10-2005-0109093, filed on Nov. 15, 2005, the disclosure of which is hereby incorporated by reference herein in its entirety.

FIELD OF THE INVENTION

The present invention relates to steering column locking devices for vehicles and, more particularly, to a mounting structure of a steering column locking device for vehicles which makes it possible for the steering column locking device to be rotated upwards with respect to a steering column by an impact when the knee of a driver bumps against the steering column locking device in an accident, thereby minimizing the injury to the knee of the driver.

BACKGROUND OF THE INVENTION

As well known to those skilled in the art, a steering column locking device locks a steering column to prevent the steering column from rotating when there is no vehicle key in a key cylinder. The steering column locking device includes a locking bar which protrudes towards the steering column when the vehicle key is removed from the key cylinder. A locking hole is formed in the steering column such that an end of the locking bar is locked in the locking hole to prevent the steering column from undesirably rotating.

However, in the conventional steering column locking device mounted to the steering column, because the conventional steering column locking device is fixed to the steering column, when an accident occurs, the knee of a driver may bump against the steering column locking device, thus resulting a severe injury to the knee of the driver.

SUMMARY OF THE INVENTION

Embodiments of the present invention provide a mounting structure of a steering column locking device for vehicles which makes it possible for the steering column locking device to be rotated upwards with respect to a steering column by an impact force when part of a driver's body bumps against the steering column locking device in an accident, thereby minimizing injury to the driver.

A mounting structure of a steering column locking device according to an embodiment of the present invention includes a connection housing which is mounted at a first end thereof to a steering column, with a coupling slot formed in a second end of the connection housing. A coupling protrusion is provided on the steering column locking device so that the coupling protrusion is movable inserted into the coupling slot of the connection housing. A locking pin is fitted into the coupling slot to support the coupling protrusion such that the coupling protrusion remains a stationary state. The locking pin breaks when a predetermined amount of impact or more is applied to the coupling protrusion.

The coupling slot may include a guide slot into which the coupling protrusion is inserted, and a locking slot which extends in a direction perpendicular to the guide slot, so that the coupling protrusion is inserted into and locked into the locking slot.

The coupling slot may further include two support notches which extend at predetermined positions from opposite side edges of the guide slot in opposite directions. The locking pin may include a pin body which is fitted into the guide slot of the coupling slot, two wing parts which are fitted into the respective support notches, and a support part which contacts and supports the coupling protrusion inserted into and locked to the coupling slot. The support part breaks when a predetermined amount of impact or more is applied to the coupling protrusion.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
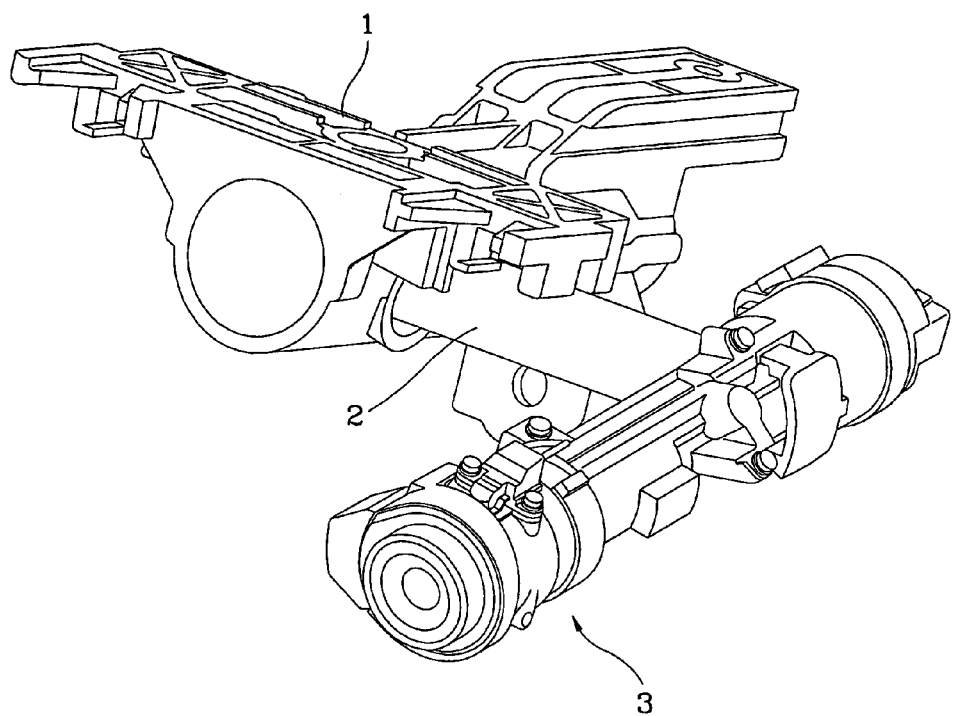
FIG. 1 is a perspective view showing a steering column locking device mounted to a steering column, according to a preferred embodiment of the present invention.
Figure 2:
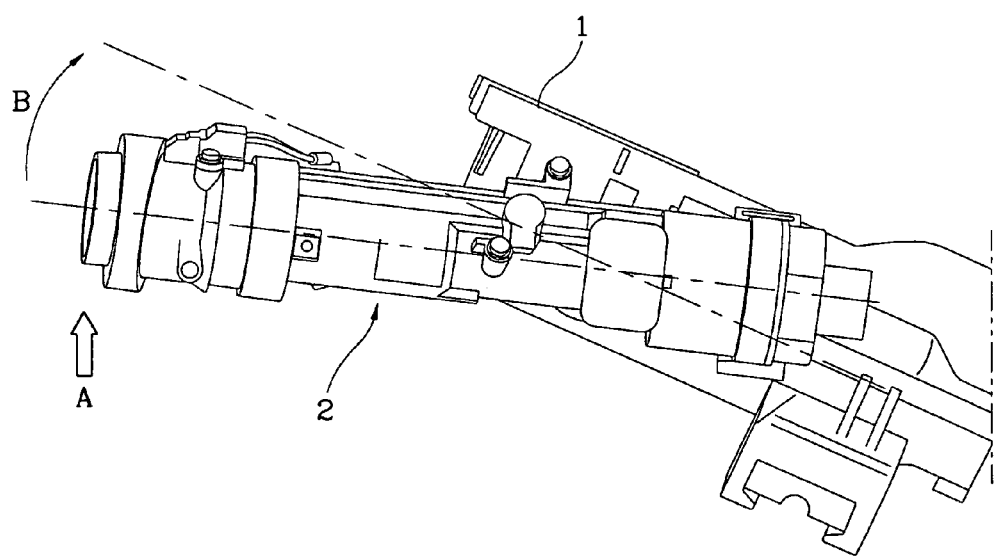
FIG. 2 is a side view showing rotation of the steering column locking device of FIG. 1 with respect to the steering column when the knee of a driver bumps against the steering column locking device.

As shown in FIG. 1, a steering column locking device 3 is coupled to a steering column 1, mounted to a vehicle body, through a connection housing 2. Referring to FIG. 2, the steering column locking device 3 is coupled to the steering column 1 in a state such that the steering column locking device 3 is inclined at a predetermined angle with respect to the steering column 1. When an accident occurs, the knee of a drive may bump against the steering column locking device 3 in the direction indicated by the arrow A of FIG. 2. In this case, the steering column locking device 3 is rotated with respect to the steering column 1 in a clockwise direction, that is, in the direction indicated by the arrow B of FIG. 2, thus mitigating injury to the driver.

Figure 3:
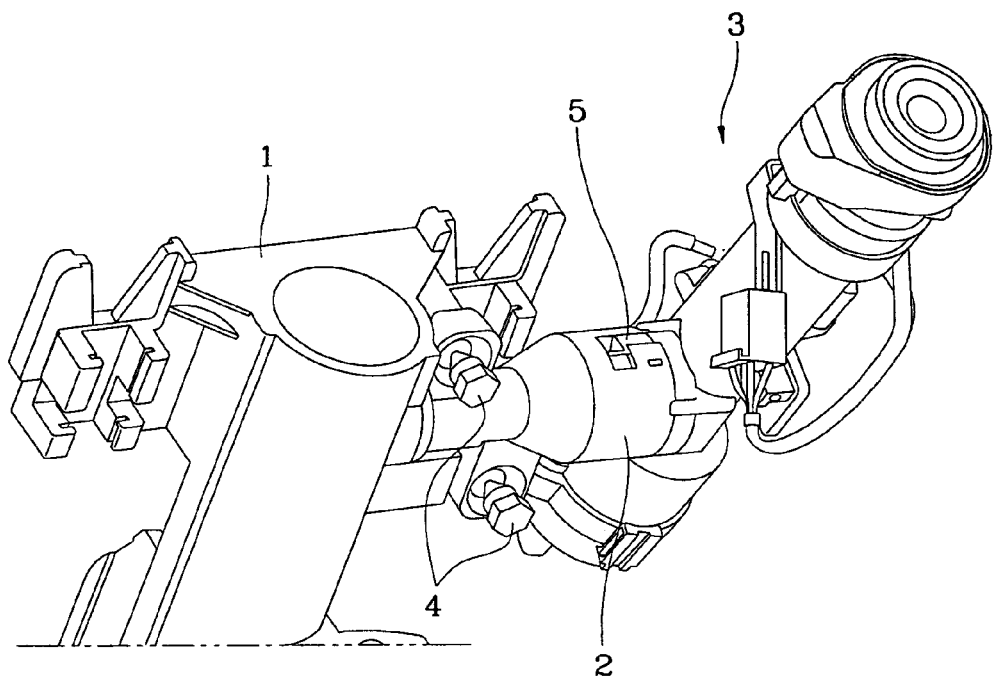
FIG. 3 is a bottom perspective view showing a connection housing to couple the steering column locking device of FIG. 1 to the steering column.

As shown in FIG. 3, the connection housing 2 is coupled at a first end thereof to the steering column 1 by two safety bolts 4. A second end of the connection housing 2 is coupled to the steering column locking device 3 by a locking pin 5. When a predetermined amount of torque or more is applied to the safety bolts 4, head parts of the safety bolts 4 break. Then, the steering column locking device 3 enters in a state of being unremovable from the steering column 1.

Figure 4:
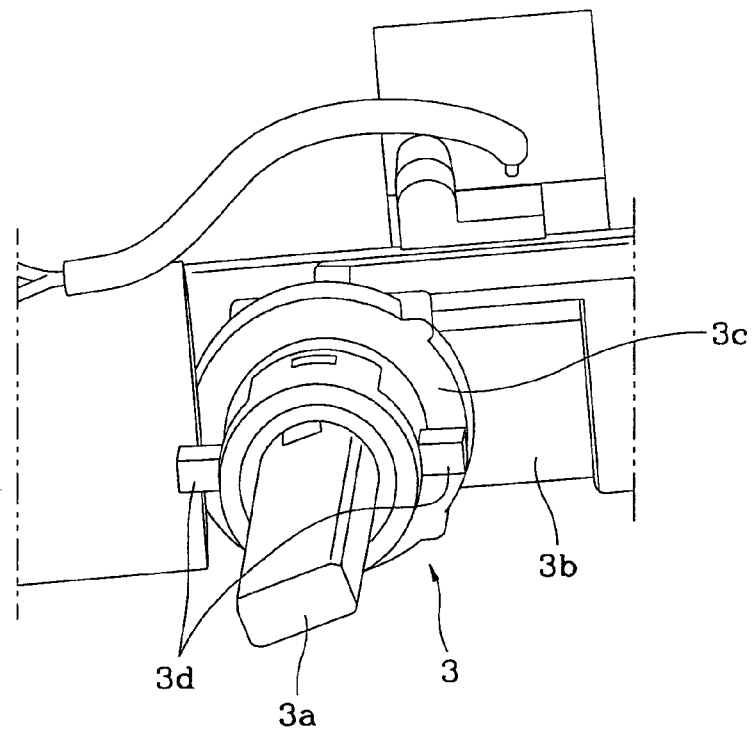
FIG. 4 is a perspective view showing an enlargement of an important part of the steering column locking device of FIG. 1.

As shown in FIG. 4, the steering column locking device 3 includes a locking bar 3a which protrudes towards the steering column 1 and is locked into a locking hole formed in the steering column 1 when a vehicle key is removed from a key cylinder. The locking bar 3a has a rod shape with an approximately rectangular cross-section. The locking bar 3a is mounted to a key cylinder housing 3b in a configuration such that the locking bar 3a perpendicularly protrudes from the key cylinder housing 3b. The locking bar 3a mounted to the key cylinder housing 3b in a state such that the locking bar 3a is inclined at a predetermined angle in a counterclockwise direction with respect to the key cylinder through 3b. The angle at which the locking bar 3a is inclined with respect to the key cylinder housing 3b is the same as the angle, shown in FIG. 2, at which the steering column locking device 3 is inclined with respect to the steering column 1.

Furthermore, two coupling protrusions 3d protrude from a circumferential outer surface of a circular boss part 3c of the key cylinder housing 3b, to which the locking bar 3a is movably mounted. The two coupling protrusions 3d are provided at symmetrical positions, that is, are spaced aprat from each other at an angular interval of 180°.

Figure 5:
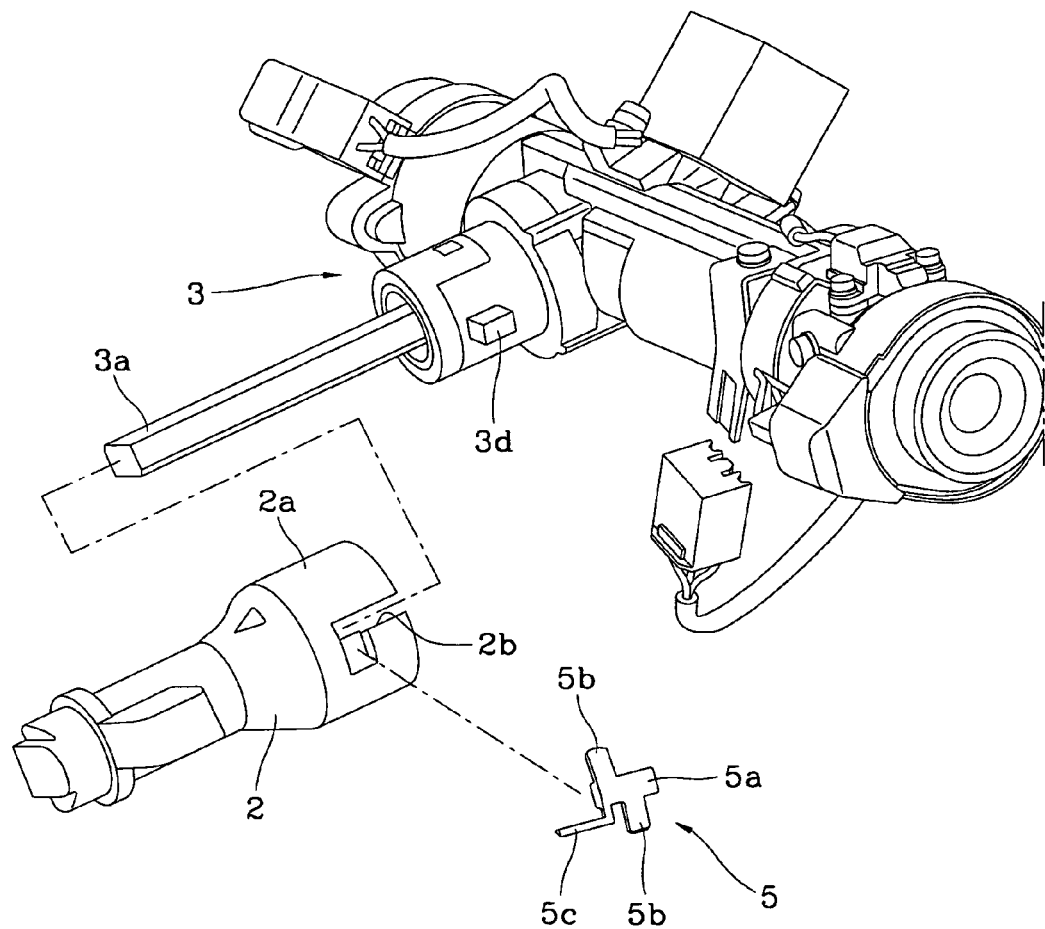
FIG. 5 is an exploded perspective view of the steering column locking device and the connection housing according to the present invention.

FIG. 5 is an exploded perspective view of the steering column locking device 3 and the connection housing 2. The connection housing 2 has a hollow tube shape. The locking bar 3a is inserted into the connection housing 2. An end 2a of the connection housing 2 that faces the steering column locking device 3 has an increased diameter. Two L-shaped coupling slots 2b, into which the two coupling protrusions 3d of the key cylinder housing 2 are inserted and locked, are formed in the end 2a of the connection housing 3b. Each L-shaped coupling slot 2b includes a guide slot, into which each coupling protrusion 3d is inserted, and a locking slot, into which the coupling protrusion 3d is inserted so that the coupling protrusion 3d enters a locked state. Each locking slot is formed in a perpendicular direction of the associated guide slot.

To maintain the state in which the coupling protrusions 3d are inserted into and locked to the respective L-shaped coupling slots 2b, a locking pin 5 is fitted into each of the L-shaped coupling slots 2b.

Figure 6:
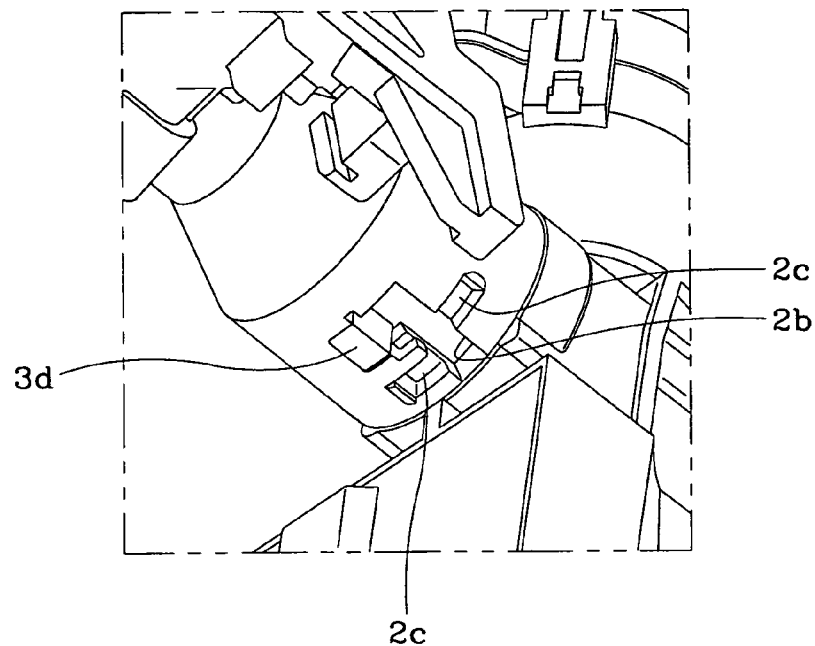
FIG. 6 illustrates a state in which a coupling protrusion of the steering column locking device is inserted into and locked into a coupling slot of the connection housing according to the present invention.

FIG. 6 illustrates the state in which the coupling protrusions 3d are inserted into and locked in the respective L-shaped coupling slots 2b. In detail, each coupling protrusion 3d is inserted into the guide slot of each L-shaped coupling slot 2b and then moved along the locking slot until the coupling protrusion 3d is locked in an end of the locking slot. Two support notches 2c, which extend from opposite sides of each L-shaped coupling slot 2b in opposite directions at predetermined positions spaced apart from each other by a predetermined distance, are formed in the end 2a of the connection housing 2. The locking pins 5 are fitted into the respective L-shaped coupling slots 2b to support the coupling protrusions 3d inserted in the L-shaped coupling slots 2b.

Each locking pin 5 includes a pin body 5a which is fitted into the guide slot of each L-shaped coupling slot 2b, and two wing parts 5b which integrally extend from the pin body 5a in opposite directions and are fitted into the respective support notches 2c. Each locking pin 5 further includes a support part 5c which integrally extends from the pin body 5a in a direction parallel to the pin body 5a and is inserted into the locking slot so that the support part 5c contacts and support the coupling protrusion 3d.

Figure 7:
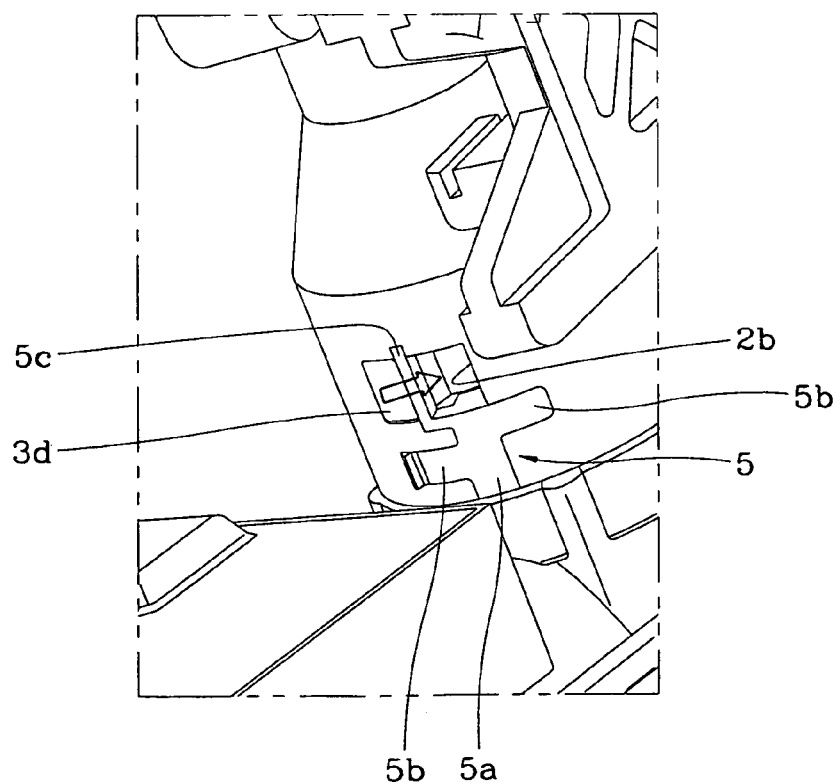
FIG. 7 shows a locking pin fitted into the coupling slot of FIG. 6.

The insertion of the locking pin 5 into the L-shaped coupling slot 2b is shown in FIG. 7. The overall length of the locking slot of each L-shaped coupling slot 2b is greater than the width of each coupling protrusion 3d. Thus, when the knee of the driver bumps against the steering column locking device 3 in an accident so that the impact is transferred to the coupling protrusion 3d, the coupling protrusion 3d breaks the support part 5c of the support pin 5, moves along the locking slot in the direction indicated by the arrow of FIG. 7, and reaches an opposite end of the locking slot.

As such, when each coupling protrusion 2d is moved from one end of each locking slot to the other end, the steering column locking device 3 is rotated at an angle of approximately 13° with respect to the steering column.

As a result, when part of the driver's body bumps against the steering column locking device 3 in an accident, the locking pins 5, which have locked the steering column locking device 3 to the steering column 1, breaks and thus absorb and mitigate the impact. Simultaneously, the steering column locking device 3 is rotated at a predetermined angle with respect to the steering column 1, thus reducing the impact velocity of the driver's body against the steering column locking device 3, thereby minimizing injury to the driver.

As is apparent from the foregoing, the present invention provides a mounting structure of a steering column locking device in which the steering column locking device is rotatably mounted to a steering column through a locking pin that breaks when a predetermined amount of impact or more is applied to the locking pin, so that, when part of a driver's body bumps against the steering column locking device in an accident, the locking pin breaks and thus absorbs and mitigates the impact, and, simultaneously, the steering column locking device rotates at a predetermined angle with respect to the steering column, thus reducing the impact velocity of the driver's body against the steering column locking device, thereby minimizing injury to the driver.

What is claimed is:

1. A mounting structure of a steering column locking device, comprising:
   a connection housing mounted at a first end thereof to a steering column, with a coupling slot formed in a second end of said connection housing;
   a coupling protrusion provided on said steering column locking device so that said coupling protrusion is movably inserted into said coupling slot of said connection housing; and
   a locking pin fitted into said coupling slot to support said coupling protrusion such that said coupling protrusion remains in a stationary state, said locking pin breaking when a predetermined amount of impact or more is applied to said coupling protrusion,
   wherein the coupling slot comprises:
   (i) a guide slot into which the coupling protrusion is inserted;
   (ii) a locking slot extending in a direction perpendicular to the guide slot, so that said coupling protrusion is inserted into and locked into the locking slot; and
   (iii) two support notches extending at predetermined positions from opposite side edges of the guide slot in opposite directions; and
   wherein the locking pin comprises:
   (i) a pin body fitted into the guide slot of the coupling slot;
   (ii) two wing parts fitted into the respective support notches; and
   (iii) a support part to contact and support the coupling protrusion inserted into and locked to the coupling slot, the support part breaking when a predetermined amount of impact or more is applied to the coupling protrusion.

2. The mounting structure as defined in claim 1, wherein said steering column locking device comprises: a locking bar inserted into said connection housing and removably locked to said steering column, thus holding said steering column.

3. The mounting structure as defined in claim 2, wherein said coupling protrusion comprises two coupling protrusions provided at opposite positions on a circumferential outer surface of a boss part of said steering column locking device through which said locking bar is inserted, and said coupling slot, into which said coupling protrusions are inserted, are formed in a circumferential surface of said connection housing at a predetermined position corresponding to each of said coupling protrusions.

4. The mounting structure as defined in claim 3, wherein said connection housing is coupled to said steering column by a safety bolt having a structure such that a head part of said safety bolt breaks when a predetermined amount of impact or more is applied to said safety bolt.

5. A vehicle comprising a mounting structure of claim 1.

* * * * *